United States Patent [19]

McCollum et al.

[11] 3,929,867

[45] Dec. 30, 1975

[54] MIXED ESTER PLASTIC ADDITIVE

[75] Inventors: Anthony W. McCollum; David C. Hull, both of Longview, Tex.

[73] Assignee: Eastman Kodak Company, Rochester, N.Y.

[22] Filed: Aug. 6, 1973

[21] Appl. No.: 385,759

[52] U.S. Cl. .............................. 260/475 P; 260/31.6
[51] Int. Cl.² ........................................... C07C 69/82
[58] Field of Search................................... 260/475 P

[56] References Cited
UNITED STATES PATENTS 3,714,053   1/1973   Mottez et al. ................... 260/475 P

*Primary Examiner*—Lorraine A. Weinberger
*Assistant Examiner*—E. Jane Skelly
*Attorney, Agent, or Firm*—Edward R. Weber; Daniel B. Reece, III

[57] ABSTRACT

A plastic additive comprising the mixed ester reaction product of 2,2,4-trimethylpentane-1,3-diol monoisobutyrate, a monohydric alcohol of the formula ROH wherein R is straight or branched chain alkyl of 1 to 12 carbon atoms or benzyl and dimethyl terephthalate. The additive is particularly useful as a processing aid for rigid polyvinyl chloride and as a modifier for thermoplastic acrylic coatings.

3 Claims, No Drawings

MIXED ESTER PLASTIC ADDITIVE

This invention relates to a new class of materials which has been discovered to be particularly effective as a processing aid for polyvinyl chloride and other polymers and as a plasticizer for acrylic coatings. More particularly, this invention relates to the mixed ester products of an ester interchange reaction involving dimethyl terephthalate, a monohydric alcohol and 2,2,4-trimethylpentane-1,3-diol monoisobutyrate.

Increased use of plastics has resulted in an increased demand for compositions to modify the end physical properties of the plastics or to improve the characteristics of the plastic during its processing. Among the features required of an additive is the ability to be retained in the plastic composition and not be extracted by exposure to various everyday solvents to which the plastic may be exposed, such as soapy water, food oils, etc. Another desirable feature of the additive is that it should obtain the desired improvement in any particular physical property without a corresponding degradation in any other important physical property of the material. The search for suitable modifiers has encompassed a broad spectrum of organic and inorganic chemicals. However, almost universally, each additive which has improved processing characteristics has also produced a degradation of desirable physical properties such as clarity, impact strength, etc.

Therefore, an object of the current invention is to provide a processing aid for polyvinyl chloride which will not result in loss of ultimate physical properties of the end product.

Another object of the invention is to provide a processing aid for polyvinyl chloride which is less subject to extraction by solvents normally encountered.

Yet another object of the invention is to provide a processing aid for polyvinyl chloride which will result in increased clarity of the end product.

These and other objects of the invention will become clear from the following specification and the appended claims.

The composition of the instant invention is the mixed terephthalic ester reaction product of an ester interchange reaction involving dimethyl terephthalate, a monohydric alcohol of from 1 to 12 carbon atoms, and 2,2,4-trimethylpentane-1,3-diol monoisobutyrate, hereinafter referred to as PDIB. The new composition exhibits unique properties as a plasticizer for acrylic coatings and as a processing aid for polyvinyl chloride and other polymers. The new composition shows extreme permanence in vinyls and coatings when subject to typical soapy water, oil, and hexane extraction tests.

The composition of the instant invention is prepared by conventional ester interchange reactions with the composition of the end product being controlled by the continuous removal of methanol so that the final product has an apparent molecular weight of from about 400 to about 1000. The molar ratio of the reactants, i.e., monohydric alcohol/PDIB/dimethyl terephthalate can be varied from about 0.1/1.9/1.0 to about 1.9/0.1/1.0, respectively. A preferred ratio of reactants is 1.0/1.0/1.0, respectively. Molar ratios outside the above limits produce compositions which are essentially either di(PDIB) terephthalate or dialkyl terephthalate and which behave as ordinary plasticizers with consequent loss of impact strength and increase in flexibility when added to polyvinyl chloride. These properties are undesirable for use as a processing aid in rigid polyvinyl chloride.

Monohydric alcohols which may be used in the reaction may be any straight or branched chain aliphatic or benzyl alcohol of from 1 to 12 carbon atoms. For purposes of convenience the term "alkyl" whenever used in this specification is broadened so as to include benzyl alcohol, according to the preceding definition, unless such a breadth is obviously inconsistent with the portion of the specification involved. Typical monohydric alcohols include methanol, ethanol, normal butanol, isobutanol, normal hexanol, 2-methylpentanol, 2-ethylhexanol, 2,2,4-trimethylpentanol, aromatic benzyl alcohol and 2,4-diethyloctanol.

A typical preparation would include the ester interchange reaction of dimethyl terephthalate with isobutanol and PDIB at a reaction temperature of from about 80°C. to about 200°C. using a concentration of from about 0.05 to 0.4 weight percent of a suitable catalyst such as, for example, dibutyltin oxide, zinc acetate, zinc chloride, stannous oxalate or an alkaline metal alkoxide. The reaction is driven in the desired direction by distilling methanol from the reaction mixture. The resultant product is a mixture of diesters including PDIB isobutyl terephthalate, diisobutyl terephthalate, di(PDIB) terephthalate, methyl isobutyl terephthalate, and a mixture of bis-terephthalates which arises from the interchange of dimethyl terephthalate with the isobutyrate of PDIB giving methyl isobutyrate and the mixture of bis-terephthalates.

For convenience hereinafter, the specific product resulting from use of isobutanol as the monohydric alcohol will be identified as DIBT. Likewise, the generic product resulting from use of any of the previously-defined monohydric alcohols will be identified as DAT.

The chemistry of the reaction is as follows

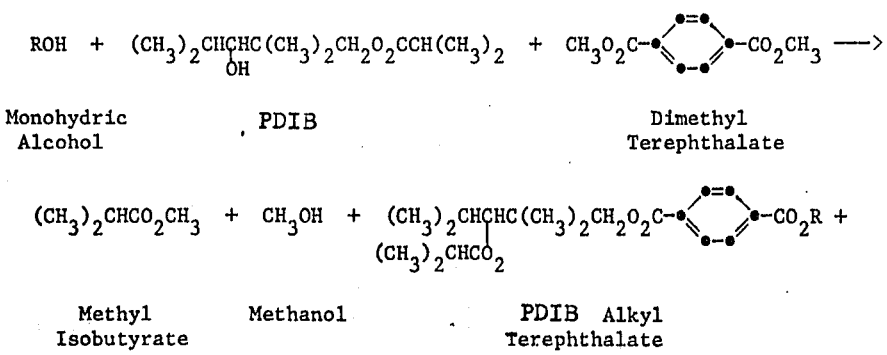

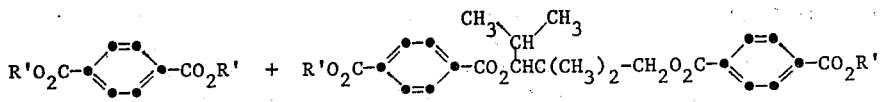

Mixed Dialkyl Terephthalate Esters      bis-Terephthalates

R = $C_1$ through $C_{12}$ alkyl or benzyl.

R' = $C_1$ through $C_{12}$ alkyl, benzyl, or PDIB

The 2,2,4-trimethylpentane-1,3-diol which is a portion of the bis-terephthalate mixture is the result of the participation of a portion of the PDIB in a multiple ester interchange wherein 2,2,4-trimethylpentane-1,3-diol, hereinafter referred to as PD, is formed in conjunction with methyl isobutyrate. The PD then, either directly or more probably as a sequence of ester interchanges, enters into a bis-terephthalate formation and accounts for the higher molecular weight portion of the product mixture. The following general formula illustrates the type of bis-terephthalate which is formed.

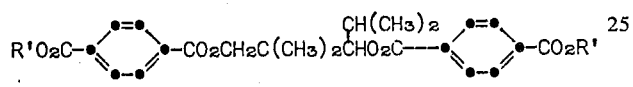

R' = alkyl of 1–12 carbons, benzyl, or PDIB.

The basic unit is PD bis-terephthalate which is terminated with a member selected from the group consisting of $C_1$–$C_{12}$ alkyl, benzyl and PDIB.

Table I presents a typical product composition and shows a total of 25 percent bis-terephthalates. The components in the product mixture were separated by gas chromatography and collection of the individual components allowed structural assignment for the observed peaks.

TABLE I

Typical Gas Chromotographic Analysis of a Product Mixture

| Component | Molecular Weight | Weight Percent |
|---|---|---|
| Methyl Isobutyl Terephthalate | 236 | 3.2 |
| Diisobutyl Terephthalate | 278 | 17.5 |
| Methyl PDIB Terephthalate | 378 | 7.8 |
| PDIB Isobutyl Terephthalate | 420 | 29.2 |
| di(PDIB) Terephthalate | 562 | 9.6 |

R'O₂C-⟨⟩-CO(PD)OC-⟨⟩-CO₂R'

PD bis(monoalkyl terephthalate)

| R' | R' | | |
|---|---|---|---|
| Methyl | Isobutyl | 504 | 3.1 |
| Isobutyl | Isobutyl | 546 | 9.5 |
| PDIB | Isobutyl | 688 | 5.3 |
| PDIB | PDIB | 830 | 7.1 |
| Others | | | 7.0 |

The apparent molecular weight of the product mix will vary, depending upon the reaction time, temperature, and the ratio of feed materials. However, for most purposes, the apparent molecular weight will fall within a range of from about 400 to about 1000. An apparent molecular weight of 400 represents the lowest average molecular weight for a product mix incorporating a mixed PDIB alkyl terephthalate, i.e., if the mixture is predominantly PDIB methyl terephthalate (molecular weight = 378), the average molecular weight of the mixture would be expected to be 400 or above. At apparent molecular weights above 1000, the product becomes glassy and extremely viscous. Higher apparent molecular weights generally are produced by using higher reaction temperatures and longer reaction times which tend to promote the formation of increased amounts of bis-terephthalates with concomitant increase in the amount of methyl isobutyrate distilled off with the methanol. Generally, the composition of the useful product mixture of the instant invention will fall within the ranges shown in Table II.

TABLE II

| | Applicable Weight Percent Ranges | |
|---|---|---|
| Ingredient[1] | Useful | Preferred |
| Dialkyl Terephthalate | 0.1–50 | 5–25 |
| PDIB Alkyl Terephthalate | 10–60 | 30–60 |
| di(PCIB) Terephthalate | 1–60 | 5–20 |
| PD bis(monoalkyl) terephthalate | 20–88.9 | 10–25 |

[1]For purposes of convenience "alkyl" is defined to include the straight or branched chain alkyl groups of from 1 to 12 carbon atoms and the benzyl ring.

The following examples will further illustrate the compositions of the present invention and will show the advantages over the prior art materials. It should be understood, however, that these examples are illustrative only, and in no way limit the scope of the invention as described in the specification and the appended claims.

Two 2-liter stirred, steam-jacketed reactors are connected in series. Each reactor has a 1-inch by 15-inch Penn State packed column with variable take-off head and condenser attached to it. The reactors are hooked together so that the product is drawn from the bottom of the first reactor and fed into the top of the second reactor. The product is then drawn from the bottom of the second reactor and fed continuously to a gas stripper. The base temperature for the reactors can be varied from 120° to 200°C. Feed to the reactors is accomplished through two separate streams with the monohydric alcohol being fed in one stream, and the other reactants, i.e., PDIB, dimethyl terephthalate and the catalyst being fed in the second stream. The gas stripper is a 1-inch by 36-inch column packed with Berl saddles. Nitrogen at 200°C. is fed to the gas stripper to remove low boilers and unreacted alcohols. The base product from the gas stripper is the DAT of the instant invention. The overhead from the gas stripper can be recycled to the first reactor. This overhead consists largely of unreacted alcohols.

Examples 1–15 illustrate variations of the product DAT which may be obtained by varying the feed materials and the reaction temperatures. Where the total analysis adds to less than 100% the difference represents material present in too small a concentration to identify.

EXAMPLES

| | 1 | 2 | 3 |
|---|---|---|---|
| Feed A | | | |
| Monohydric Alcohol, | Methanol | Ethanol | n-Butanol |
| g/hr. | — | 8 | 15 |
| Feed B | | | |
| PDIB, g/hr. | 100 | 100 | 90 |
| Dimethyl Terephthalate, g/hr. | 90 | 80 | 90 |
| Catalyst, | Dibutyltin Oxide | Dibutyltin Oxide | Zinc Acetate |
| g/hr. | 0.3 | 0.3 | 0.5 |
| Reactor 1 | | | |
| Temperature, °C. | 160 | 120 | 186 |
| Distillate, g/hr. | 25 | 20 | 30 |
| Residence Time, hr. | 4.0 | 4.0 | 2 |
| Reactor 2 | | | |
| Temperature, °C. | 175 | 140 | 195 |
| Distillate, g/hr. | 6 | 5 | 4 |
| Residence Time, hr. | 2 | 3.5 | 1.5 |
| Gas Stripper | | | |
| N₂ Rate, cc/min. | 500 | | |
| Temperature, °C. | 160 | | |
| Distillate, g/hr. | 60 | | |
| Product, g/hr. | 130 | | |
| Molecular Weight | 400 | 415 | 575 |
| Gas Chromatographic Analysis, wt. % | | | |
| Methyl Alkyl* Terephthalate | — | 4 | 2 |
| Dialkyl Terephthalate | — | 27 | 18 |
| Methyl PDIB Terephthalate | 40 | 8 | 6 |
| PDIB Alkyl Terephthalate | — | 26 | 21 |
| di(PDIB) Terephthalate | 38 | 2 | 8 |

$$R'O_2C-\phantom{}\bigcirc-CO(PD)OC-\bigcirc-CO_2R'$$

| R' | R' | | | |
|---|---|---|---|---|
| Methyl | Alkyl | — | | |
| Alkyl | Alkyl | 2 | | |
| PDIB | Alkyl | 10 | 34 | 45 |
| PDIB | PDIB | 10 | | |

EXAMPLES

| | 4 | 5 | 6 |
|---|---|---|---|
| Feed A | | | |
| Monohydric Alcohol, | Isobutanol | Isobutanol | Isobutanol |
| g/hr. | 15 | 40 | 39 |
| Feed B | | | |
| PDIB, g/hr. | 100 | 100 | 102 |
| Dimethyl Terephthalate g/hr. | 90 | 90 | 91 |
| Catalyst, | Dibutyltin Oxide | Dibutyltin Oxide | Dibutyltin Oxide |
| g/hr. | 0.4 | 0.3 | 0.4 |
| Reactor 1 | | | |
| Temperature, °C. | 200 | 160 | 185 |
| Distillate, g/hr. | 31 | 20 | 29.2 |
| Residence Time, hr. | 3.5 | 5.0 | 2 |
| Reactor 2 | | | |
| Temperature, °C. | 200 | 150 | 195 |
| Distillate, g/hr. | 11 | 8 | 9.7 |
| Residence Time, hr. | 4.0 | 9.0 | 1.5 |
| Gas Stripper | | | |
| N₂ Rate, cc/min. | | 800 | 1200 |
| Temperature, °C. | | 160 | 185 |
| Distillate, g/hr. | 21 | 80 | 58 |
| Product, g/hr. | 142 | 90 | 136 |
| Molecular Weight | 989 | 450 | 450 |
| Gas Chromatographic Analysis, wt. % | | | |
| Methyl Alkyl* Terephthalate | 0 | 0.2 | |
| Dialkyl Terephthalate | 5 | 9.7 | 9 |
| Methyl PDIB Terephthalate | 0 | 16.0 | 8.4 |
| PDIB Alkyl Terephthalate | 6 | 37.5 | 45.2 |
| di(PDIB) Terephthalate | 2 | 17.5 | 10 |

$$R'O_2C-\bigcirc-CO(PD)OC-\bigcirc-CO_2R'$$

| R' | R' | | | |
|---|---|---|---|---|
| Methyl | Alkyl | | 4.9 | 3.1 |
| Alkyl | Alkyl | | 5.5 | 9.5 |
| PDIB | Alkyl | 87 | 1.8 | 5.3 |
| PDIB | PDIB | | 2.4 | 7.1 |

EXAMPLES

| | 7 | 8 | 9 |
|---|---|---|---|
| Feed A | | | |
| Monohydric Alcohol, | Isobutanol | n-Hexanol | 2-Methylpentanol |
| g/hr. | 45 | 60 | 60 |
| Feed B | | | |
| PDIB, g/hr. | 100 | 100 | 100 |
| Dimethyl Terephthalate, g/hr. | 90 | 90 | 90 |
| Catalyst, | Dibutyltin Oxide | Sodium Ethoxide | Dibutyltin Oxide |
| g/hr. | 0.3 | 0.4 | 0.1 |
| Reactor 1 | | | |
| Temperature, °C. | 160 | 150 | 185 |
| Distillate, g/hr. | 35 | 25 | |
| Residence Time, hr. | 1.5 | 4 | 3.5 |
| Reactor 2 | | | |
| Temperature, °C. | 165 | 160 | 200 |
| Distillate, g/hr. | 7 | 5 | |
| Residence Time, hr. | 1.0 | 2 | 2.2 |
| Gas Stripper | | | |
| N₂ Rate, cc/min. | 1000 | 1000 | |
| Temperature, °C. | 160 | 190 | |
| Distillate, g/hr. | 52 | 100 | |
| Product, g/hr. | 140 | 150 | |
| Molecular Weight | 408 | 500 | 475 |
| Gas Chromatographic Analysis, wt. % | | | |
| Methyl Alkyl* Terephthalate | 3.7 | 3 | 3 |
| Dialkyl Terephthalate | 53 | 15 | 21 |
| Methyl PDIB Terephthalate | 0.2 | 9 | 6 |
| PDIB Alkyl Terephthalate | 14 | 40 | 23 |
| di(PDIB) Terephthalate | 1.8 | 6 | 2 |

$$R'O_2C-\bigcirc-CO(PD)OC-\bigcirc-CO_2R'$$

| R' | R' | | | |
|---|---|---|---|---|
| Methyl | Alkyl | 1.9 | | |
| Alkyl | Alkyl | 18 | | |
| PDIB | Alkyl | 0.6 | 27 | 40 |
| PDIB | PDIB | 1.7 | | |

EXAMPLES

| | 10 | 11 | 12 |
|---|---|---|---|
| Feed A | | | |
| Monohydric Alcohol, | 2-Ethylhexanol | 2-Ethylhexanol | 2,2,4-Trimethylpentyl |
| g/hr. | 70 | 90 | 70 |
| Feed B | | | |
| PDIB, g/hr. | 100 | 100 | 100 |
| Dimethyl Terephthalate, g/hr. | 90 | 80 | 80 |
| Catalyst, | Dibutyltin Oxide | Stannous Oxalate | Dibutyltin Oxide |
| g/hr. | 0.5 | 0.3 | 0.2 |
| Reactor 1 | | | |
| Temperature, °C. | 185 | 180 | 170 |
| Distillate, g/hr. | 22 | 22 | 27 |
| Residence Time, hr. | 2.1 | 3.7 | 5 |
| Reactor 2 | | | |
| Temperature, °C. | 195 | 200 | 180 |
| Distillate, g/hr. | 8 | | 7 |
| Residence Time, hr. | 1.4 | 2.3 | 2 |
| Gas Stripper | | | |
| N₂ Rate, cc/min. | 1000 | | |
| Temperature, °C. | 160 | | |
| Distillate, g/hr. | 99 | | |
| Product, g/hr. | 231 | | |
| Molecular Weight | 550 | 862 | 625 |
| Gas Chromatographic Analysis, wt. % | | | |
| Methyl Alkyl* Terephthalate | 8 | 1 | 2 |
| Dialkyl Terephthalate | 21 | 4 | 5 |

-continued
EXAMPLES

| | 12 | 5 | 8 |
|---|---|---|---|
| Methyl PDIB Terephthalate | 12 | 5 | 8 |
| PDIB Alkyl Terephthalate | 16 | 15 | 31 |
| di(PDIB) Terephthalate | 8 | 3 | 6 |

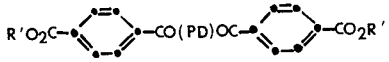

| R' | R' | | | |
|---|---|---|---|---|
| Methyl | Alkyl | | | |
| Alkyl | Alkyl | | | |
| PDIB | Alkyl | 34 | 70 | 38 |
| PDIB | PDIB | | | |

EXAMPLES

| | 13 | 14 | 15 |
|---|---|---|---|
| Feed A | | | |
| Monohydric Alcohol, | 2,4-Diethyloctanol | Benzyl | PDIB |
| g/hr. | 75 | 60 | 90 |
| Feed B | | | |
| PDIB, g/hr. | 100 | 100 | 90 |
| Dimethyl Terephthalate, g/hr. | 90 | 90 | 100 |
| Catalyst, | Dibutyltin Oxide | Dibutyltin Oxide | Dibutyltin Oxide |
| g/hr. | 0.2 | 0.1 | 0.1 |
| Reactor 1 | | | |
| Temperature, °C. | 175 | 180 | 190 |
| Distillate, g/hr. | | 25 | 22 |
| Residence Time, hr. | 3.0 | 3.0 | 5.0 |
| Reactor 2 | | | |
| Temperature, °C. | 180 | 180 | 190 |
| Distillate, g/hr. | | 6 | 8 |
| Residence Time, hr. | 2.0 | 2.0 | 2.0 |
| Gas Stripper | | | |
| N₂ Rate, cc/min. | | | |
| Temperature, °C. | | | |
| Distillate, g/hr. | | | |
| Product, g/hr. | | | |
| Molecular Weight | 510 | 600 | 620 |
| Gas Chromatographic Analysis, wt. % | | | |
| Methyl Alkyl* Terephthalate | 6 | 7 | — |
| Dialkyl Terephthalate | 19 | 10 | — |
| Methyl PDIB Terephthalate | 10 | 5 | — |
| PDIB Alkyl Terephthalate | 21 | 51 | — |
| di(PDIB) Terephthalate | 7 | 7 | 65 |

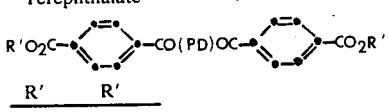

| R' | R' | | | |
|---|---|---|---|---|
| Methyl | Alkyl | | | |
| Alkyl | Alkyl | | | |
| PDIB | Alkyl | 20 | 18 | 30 |
| PDIB | PDIB | | | |

*Alkyl refers to the monohydric alcohol used in Feed A (i.e., isobutanol as Feed A becomes isobutyl in chromatographic analysis of product).

The utility of DAT is obvious from its unique and unexpected properties, and is demonstrated by the following examples.

DAT is very compatible with polyvinyl chloride homopolymer and copolymers, producing clear plastic material of a very permanent nature. It does not impart flexibility to polyvinyl chloride, as normally expected with esters, but yields rigid polyvinyl chloride with a lower processing temperature than normally achieved. For example, di-2-ethylhexyl terephthalate or dibutyl terephthalate cannot be used as a processing aid for rigid polyvinyl chloride because they impart flexibility and, at low concentration, poor impact strength.

Compositions containing DAT offer utility for polyvinyl chloride applications including plastic bottles, swimming pool liners, automotive gasketing, permanent wire coatings and other molding, extruding, or calendering applications requiring permanence and/or clarity.

Compositions are given below incorporating DAT as a processing aid for rigid polyvinyl chloride. The test results from the Brabender and two roll mill indicate the rapidity at which polyvinyl chloride reaches a melt stage. Shorter times are desired by a processor. Torque is an indication of the work required during processing. Normally, additives to polyvinyl chloride should only minimally increase the torque requirements.

EXAMPLE 16

| | A | B | C | D | E |
|---|---|---|---|---|---|
| Polyvinyl Chloride Resin, grams | 100 | 100 | 100 | 100 | 100 |
| Ba-Cd Stabilizer, grams | 2 | 2 | 2 | 2 | 2 |
| Stearic Acid, grams | 0.5 | 0.5 | 0.5 | 0.5 | 0.5 |
| Processing Aids, grams | 0 | | | | |
| Product from Example 5, PDIB Isobutyl Terephthalate | | 5 | | | |
| Product from Example 1, PDIB Methyl Terephthalate | | | 5 | | |
| Product from Example 9, PDIB 2-Methylpentyl Terephthalate | | | | 5 | |
| Product from Example 13, PDIB 2,4-Diethyloctyl Terephthalate | | | | | 5 |
| Two Roll Mill Band (Fusion) Time, 350°F., min. | 16 | 3 | 3 | 3 | 3 |
| Brabender Plastigraph Fusion Time, 350°F., min. ASTM D2538 | 19 | 4 | 4 | 4 | 4 |
| Torque at Fusion, 10³ meter-grams ASTM D2538 | 2.1 | 2.3 | 2.2 | 2.3 | 2.3 |

Note:
Equivalent results are noted when the products of Examples 2, 3, 4, 6, 7, 8, 10, 11, 12, 14 and 15 are tested in a similar manner.

EXAMPLE 17

The physical properties of rigid polyvinyl chloride are usually impaired by the addition of an additive such as dioctyl phthalate, di(2-ethylhexyl) terephthalate, or dibutyl terephthalate. Addition of DAT provides a higher impact resistance with insignificant effect on heat deflection temperature and strength properties as illustrated by the following example.

| Formulation | ASTM D256 Izod Impact, 23°C., ft.-lb./in. | | ASTM D648 Heat Deflection Temp. at 264 psi, °C. | ASTM D790 Flexural, psi × 10⁵ | | ASTM D638 Tensile Strength, psi × 10³ | |
|---|---|---|---|---|---|---|---|
| | Notched | Unnotched | | Modulus | Strength | Yield | Fracture |
| Example 16-A (Control) | 0.7 | 10 | 60 | 4.6 | 1.3 | 8.4 | 5.4 |
| Example 16-B | 0.7 | 12 | 59 | 4.8 | 1.4 | 10 | 5.6 |
| Example 16-C | 0.6 | 10 | 60 | 4.7 | 1.4 | 9.9 | 5.6 |
| Example 16-D | 0.7 | 10 | 61 | 4.8 | 1.4 | 10 | 5.7 |
| Example 16-E | 0.7 | 10 | 60 | 4.8 | 1.4 | 10 | 5.6 |
| Di(2-ethylhexyl) Phthalate, 5 phr | 0.2 | 3 | 55 | 4.4 | 1.3 | 9 | 4.8 |
| Di(2-ethylhexyl) Terephthalate, 5 phr | 0.2 | 3 | 56 | 4.4 | 1.2 | 8.5 | 4.9 |
| Dibutyl Terephthalate, 5 phr | 0.2 | 3 | 55 | 4.2 | 1.3 | 8.4 | 5.0 |

EXAMPLE 18

As illustrated in the following examples, DIBT gives thermoplastic acrylic coatings unusually hard surfaces without undue sacrifice in other important coating properties. The Tukon hardness of the acrylic coating incorporating PDIB isobutyl terephthalate is 50 percent harder when compared with neopentyl glycol-phthalate-adipate, a typical polyester plasticizer.

| | Wt. % |
|---|---|
| Acrylic resin (40%)* | 26.0 |
| EAB 531-1 (Product of Eastman Kodak Company) | 3.5 |
| Plasticizer | 4.0 |
|   Case A: Example 5, DIBT | |
|   Case B: Neopentyl glycol-phthalate-adipate | |
| Dioctyl phthalate | 0.4 |
| Alcoa 726 aluminum flake (65%) | 0.3 |
| Blue pigment dispersion** | 0.5 |
| Toluene | 21.5 |
| Acetone | 19.6 |
| Ektasolve EE Acetate (Product of Eastman Kodak Company) | 24.2 |
| | 100.0 |

*Dissolved in 70/30 mixture of toluene and acetone. The acrylic resin is a copolymer of isobutyl methacrylate and methyl methacrylate present in the ratio of 85/15.

**40% Phthalocyanine Blue, 50% EAB 531-1, 10% butyl benzyl phthalate.

The above paint (19 percent solids) was reduced to 17 seconds No. 4 Ford Cup with a 40/30/30 blend of toluene/acetone/Ektasolve EE acetate.

| | Case A | Case B |
|---|---|---|
| Humidity Resistance (Cleveland Cabinet, 24 hr.), % gloss retention | 90 | 90 |
| UV Exposure (QUV), % gloss retention | 80 | 80 |
| Cycle Crack, cycles | 15 | 15 |
| Surface Distortion (Spotting), °F. | 143 | 140 |
| Impact Resistance (1.8 mils), ft./lb. | | |
|   Direct | 8 | 8 |
|   Reverse | 2 | 2 |
| Tukon Hardness, ft./lb. (ASTM D1474–57T) | 15.7 | 10 |

Equivalent results were achieved when the products of Examples 1–15 were tested in a similar manner. The test methods, humidity resistance, and ultraviolet light exposure indicate high gloss retention when DIBT is used as a plasticizer in acrylic coatings. Humidity resistance is determined in a Cleveland QTC Cabinet manufactured by the Q Panel Company. The test cycle is 24 hours at 150°F., 100% relative humidity. Ultraviolet resistance is determined in a QUV Cabinet also manufactured by the Q Panel Company. The test cycle is 8 hours exposure to UV radiation at 155°F. and ambient humidity plus 4 hours additional exposure at 110°F. and 100% relative humidity. Cycle cracking is a measure of the number of times a coated panel can withstand a cycle of 24 hours at 100°F. (100 percent relative humidity) followed by 20 hours at 0°F. and 4 hours at room temperature (ambient humidity). Surface distortion is the temperature at which a one percent egg albumin solution permanently stains and causes micro cracking of the coating. Impact resistance is the amount of force, applied through a ⅝ inch ball, which causes the coating to separate from the substrate. The Tukon hardness of a fused coating was evaluated by a Wilson Tukon Tester. DIBT contributes to a 50 percent harder film surface than Case B and other commercial polyester plasticizers. The magnitude of the hardness difference is unexpected.

Other uses of DAT can be enumerated. DAT is compatible with polyolefins in quantities up to 12 percent, and also serves as a processing aid in this use. DAT is also compatible with poly(ethylene terephthalate) and lowers the processing temperature of this molding plastic. DAT is compatible with other resins including poly(methyl methacrylate), poly(pivalolactone), cellulosics, and epoxy resins, and serves to reduce the melt flow index and/or processing temperature. This permits either more rapid processing or processing at lower temperatures and results in articles with smoother surfaces as a result of the improved flow characteristics.

Although the invention has been described in considerable detail with reference to certain preferred embodiments thereof, it will be understood that variations and modifications can be effected without departing from the spirit and scope of the invention as described hereinabove.

We claim:

1. The mixed ester reaction product of 2,2,4-trimethylpentane-1,3-diol-monoisobutyrate, a monohydric alcohol of the form ROH where R is straight or branch-chained alkyl of 1 to 12 carbon atoms or benzyl, and dimethyl terephthalate wherein the molar ratio of the reactants is from about 0.1/1.9/1.0 to about 1.9/0.1/1.0 respectively and which mixture has an apparent molecular weight of from about 400 to about 1000.

2. A composition of matter according to claim 1 wherein the terephthalic esters are present in the following percentages by weight:

| | |
|---|---|
| dialkyl terephthalate | 0.1–50 |
| (2,2,4-trimethylpentane-1,3-diol monoisobutyrate) alkyl terephthalate | 10–60 |
| Di(2,2,4-trimethylpentane-1,3-diol monoisobutyrate) terephthalate | 1–60 |
| 2,2,4-trimethylpentane-1,3-diol bis(monoalkyl terephthalate) | 20–88.9 | wherein the term "alkyl" corresponds to the R of the monohydric alcohol.

3. A composition of matter according to claim 2 wherein the terephthalic esters are present in the following percentages by weight:

| | |
|---|---|
| dialkyl terephthalate (2,2,4-trimethylpentane-1,3-diol monoisobutyrate) alkyl terephthalate | 5–25 |
| Di(2,2,4-trimethylpentane-1,3-diol monoisobutyrate) terephthalate | 30–60 |
| 2,2,4-trimethylpentane-1,3-diol bis(monoalkyl terephthalate) | 5–20 |
| | 10–25. |

* * * * *